Figure 3:
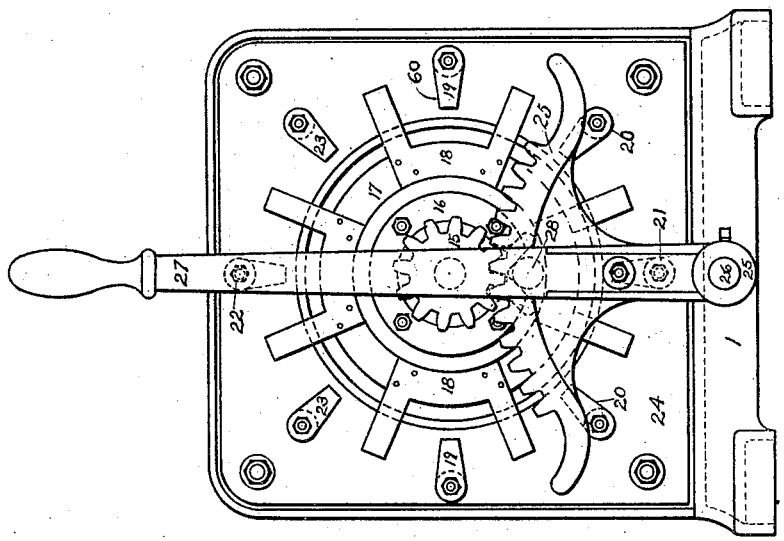

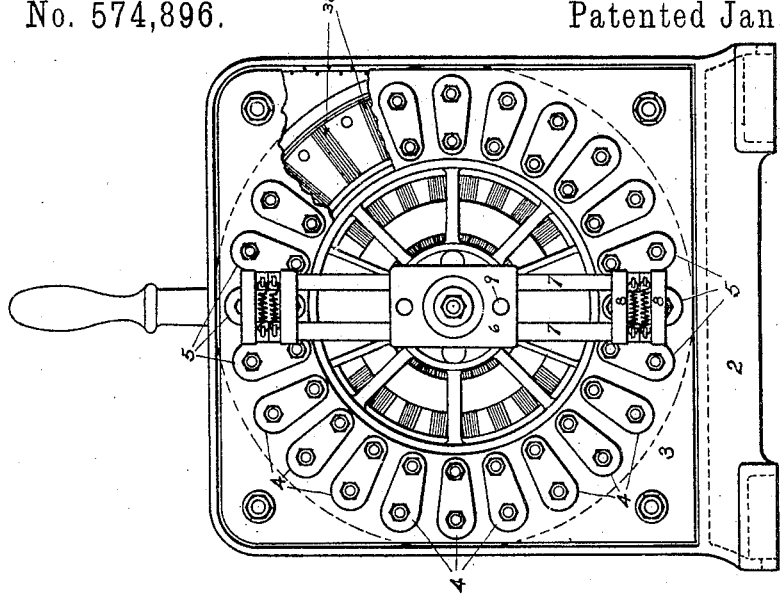

(No Model.) 6 Sheets—Sheet 2.

J. P. B. FISKE & C. P. SMITH.
COMBINED RHEOSTAT AND REVERSING SWITCH.

No. 574,896. Patented Jan. 12, 1897.

Witnesses
James N. Catlow
B. B. Holmes

Inventors
Jonathan P. B. Fiske
and Charles P. Smith
by Duncan & Page Attorneys (No Model.) 6 Sheets—Sheet 3.
J. P. B. FISKE & C. P. SMITH.
COMBINED RHEOSTAT AND REVERSING SWITCH.
No. 574,896. Patented Jan. 12, 1897.
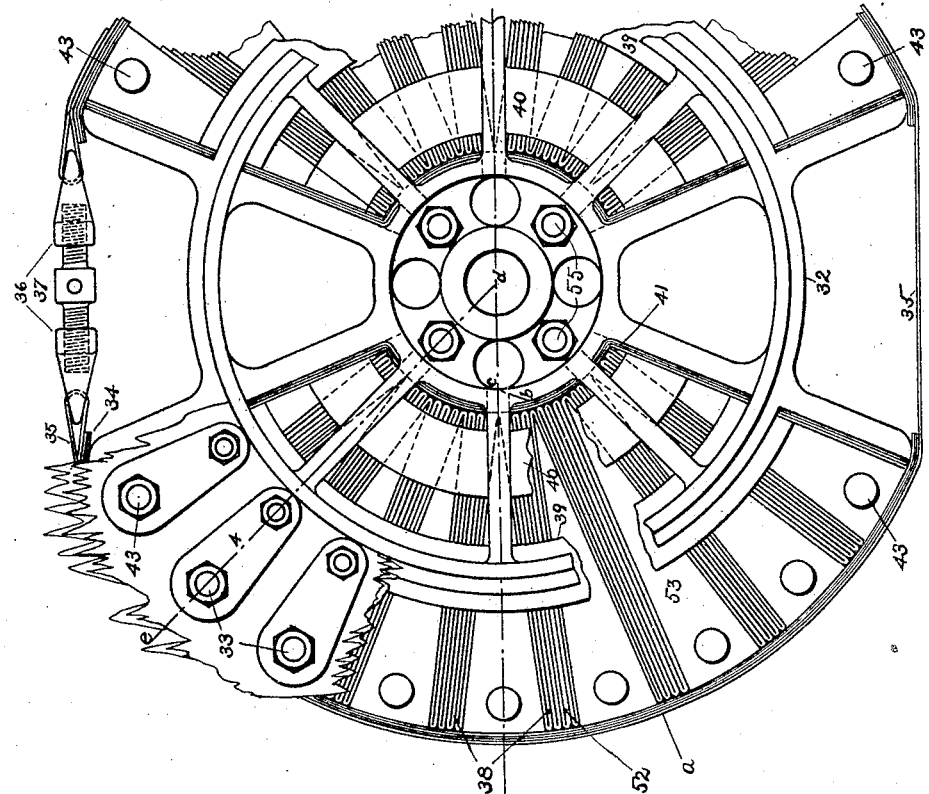
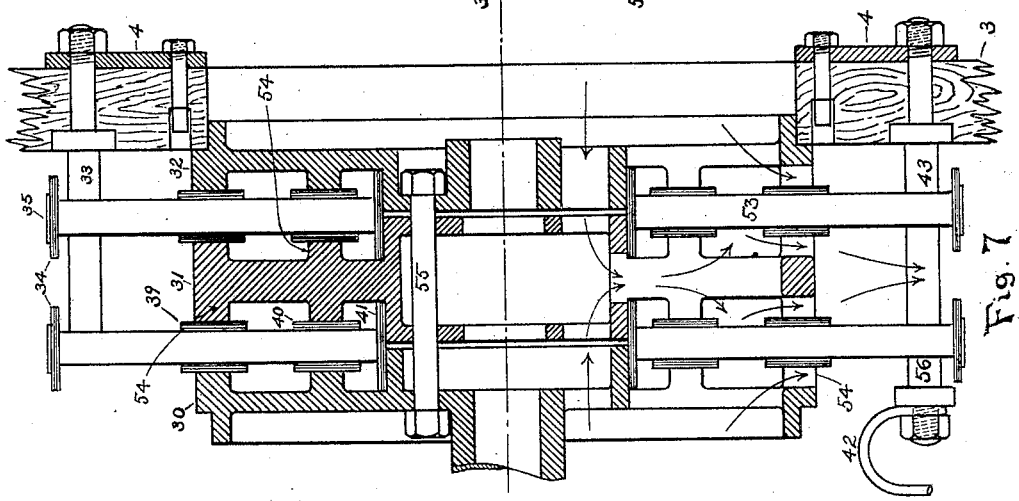
Witnesses
James N. Catlow
B. B. Holmes
Inventors
Jonathan P. B. Fiske
and Charles P. Smith
by Duncan & Page
Attorneys

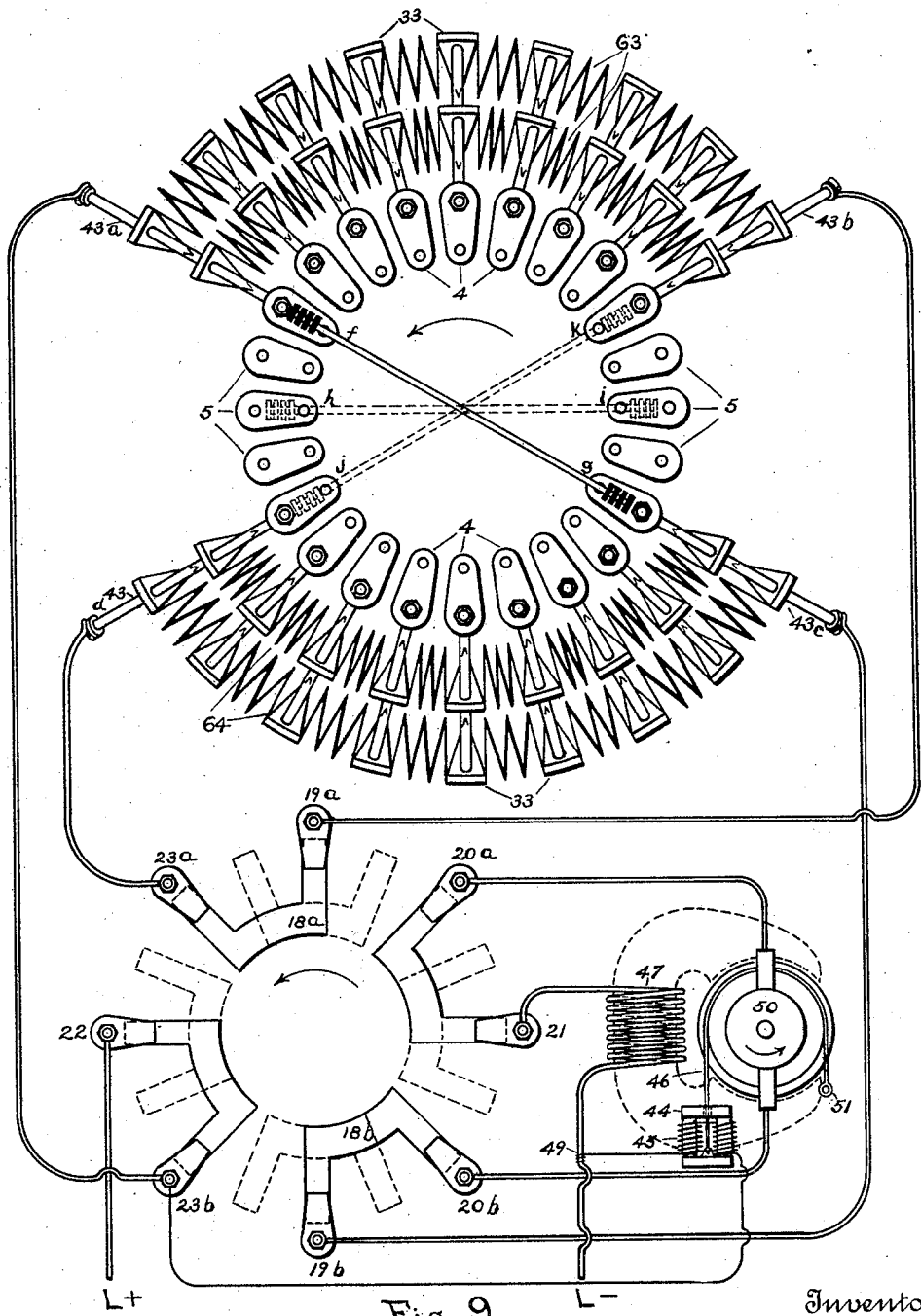

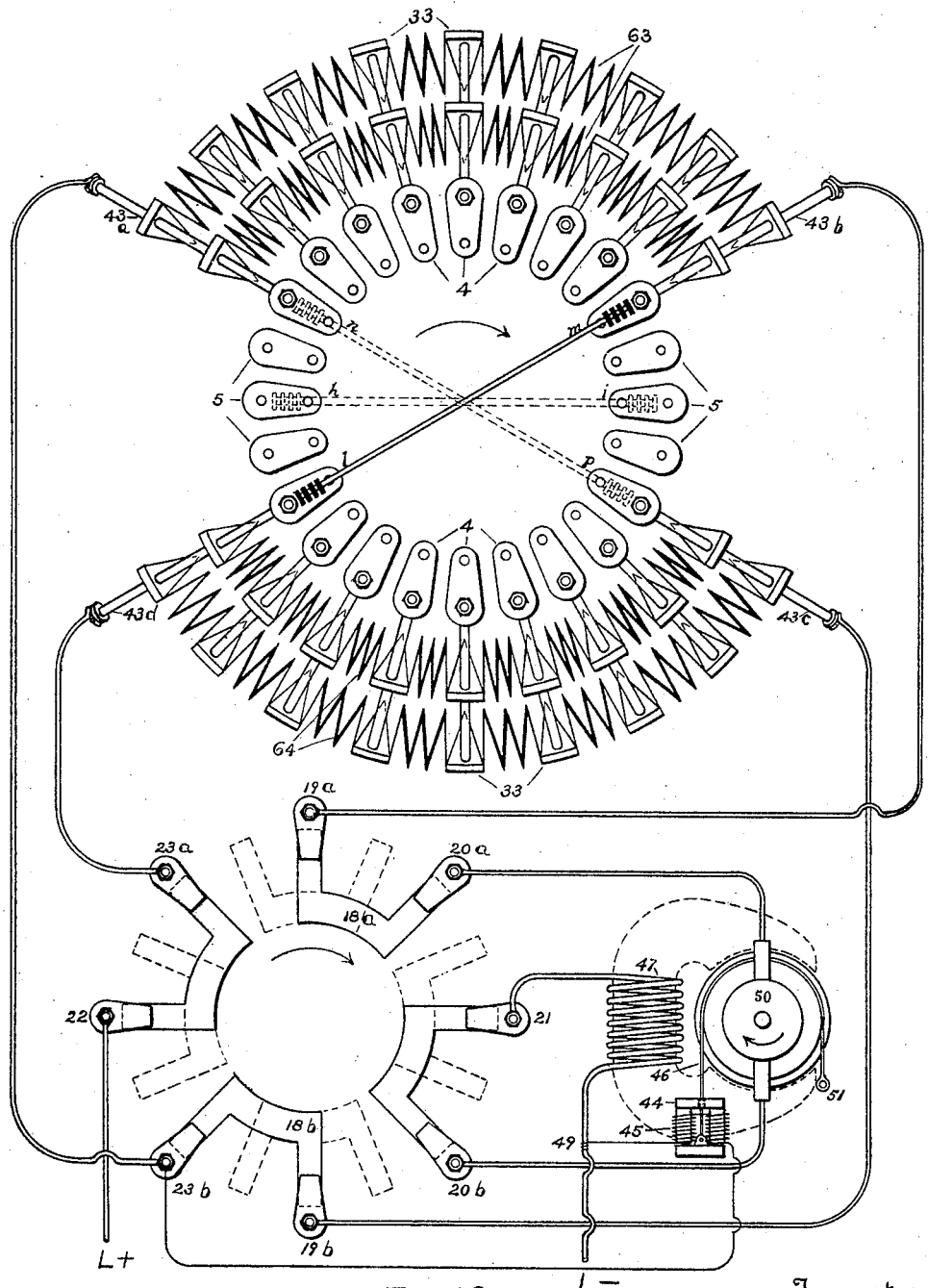

(No Model.) 6 Sheets—Sheet 6.
J. P. B. FISKE & C. P. SMITH.
COMBINED RHEOSTAT AND REVERSING SWITCH.
No. 574,896. Patented Jan. 12, 1897.
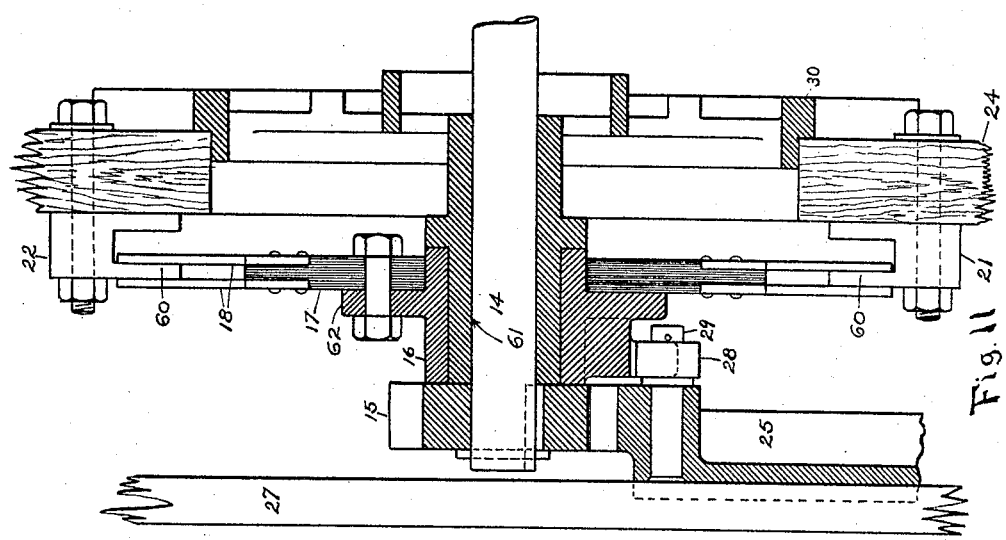
Witnesses
James N. Catlow
B. B. Holmes
Inventors
Jonathan P. B. Fiske
and Charles P. Smith
by Duncan & Page
Attorneys

UNITED STATES PATENT OFFICE.

JONATHAN P. B. FISKE AND CHARLES P. SMITH, OF ALLIANCE, OHIO.

COMBINED RHEOSTAT AND REVERSING-SWITCH.

SPECIFICATION forming part of Letters Patent No. 574,896, dated January 12, 1897.

Application filed March 18, 1895. Serial No. 542,181. (No model.)

*To all whom it may concern:*

Be it known that we, JONATHAN P. B. FISKE and CHARLES P. SMITH, citizens of the United States, and residents of Alliance, in the county of Stark and State of Ohio, have invented certain new and useful Improvements in a Combined Rheostat and Reversing-Switch, of which the following is a specification, reference being had to the drawings accompanying and forming a part of the same.

The invention which forms the subject of our present application for Letters Patent is an improvement in apparatus for controlling the speed and direction of rotation of electric motors, and although it is capable of and adapted for use generally where it is necessary or desirable to vary the resistance or change the direction of current in a circuit, or a portion thereof, it is particularly designed for the purpose of controlling motors used for propelling vehicles or raising and lowering loads, such as elevators or weights generally.

The devices of the class to which the invention pertains are commonly known as "controllers." Our improvements are more especially applicable to devices of this general class in which the movement of a lever or handle in either direction from a normal position of no current operates to first include, by a suitable mechanism, all of the resistance-coils of a rheostat in the circuit, so that before the full current can be directed to the translating device or motor the entire series of resistance-coils must be gradually cut out or short-circuited, while at the same time the direction of current to or through said translating device corresponds to the direction of movement of the said handle.

Our device possesses the general advantage of having only one set of resistance-coils and contact-plates, which are utilized both in making and breaking the circuit without regard to the direction of the current.

The invention resides in the mechanical construction and arrangement of a device of this character, and its distinguishing features will be summarized in the claims hereto appended.

Figure 4:
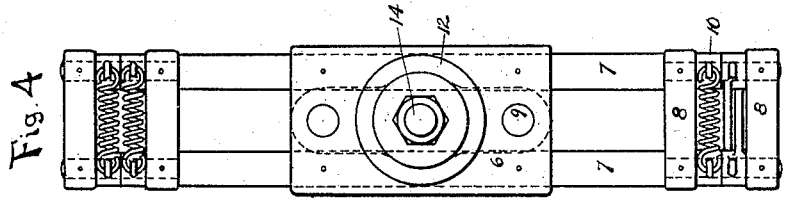
Figure 5:
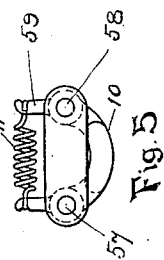
Figure 6:
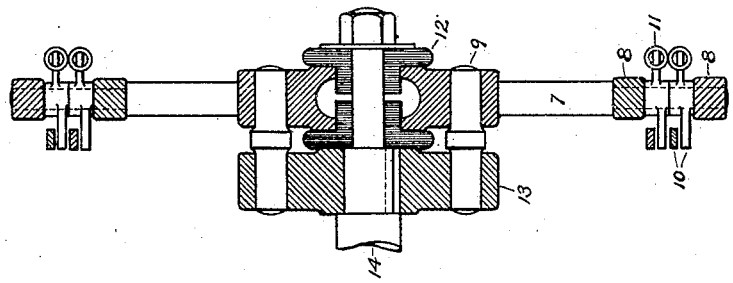

In the drawings which illustrate the construction and mode of operation of our improved controller, Figure 1 is a side view with a portion of the outer case removed. Fig. 2 is a rear view in elevation of the same, a portion of the frame or casing being removed. Fig. 3 is a similar view of the front side of the instrument. Fig. 4 is a face view of the contact-arm employed in the device. Fig. 5 is an end view of the same. Fig. 6 is a central sectional view of the contact-arm and a portion of its driving-shaft. Fig. 7 is a sectional view of Fig. 8 on the broken line $e\ d\ c\ b\ a$ of said figure. Fig. 8 is an enlarged plan view of the resistance-coils and other parts in the interior of the instrument, a portion of an insulating-base and parts attached thereto being exhibited. Fig. 9 is a diagram illustrating the circuit connections and plan of arrangement of several important parts of the apparatus. Fig. 10 is a similar view showing the same parts in a different position or relation. Fig. 11 is a central vertical section of the reversing-switch and operating mechanism of the instrument shown in Fig. 3.

The different parts of the several figures are correspondingly numbered to aid in an understanding of the same.

The instrument as a whole comprises a resistance or series of resistance coils connected to a proper switch for varying the amount of said resistance included in the circuit, as may be required, for example, in varying the speed of a motor, and of a reversing-switch for governing the direction of current and consequent direction of rotation. These elements are contained in or mounted upon a suitable casing. With them are associated the operating devices hereinafter described.

Referring to Figs. 1, 2, and 3, the numerals 1 2 designate two substantially similar metal frames forming, when assembled, casing for the controller. Frame 1 carries on its outer face the mechanism for reversing the current, the terminal blocks therefor being mounted on a base of insulating material 24. Frame 2 carries another insulating-base 3, to which are attached the terminal or contact plates of the resistance-coils and over which sweeps the contact-arm for varying such resistance. The resistance-coils are contained within the casing formed by the two frames.

On the base of the instrument is pivotally mounted a segment-gear 25, carrying a handle 27 and a stud or pin 29, Fig. 11, projecting inwardly or toward the instrument. The gear 25 meshes with a pinion 15 on a shaft 14, mounted concentrically with the terminal or contact plates of the instrument.

Referring now to Fig. 11, it will be seen that the hub 61 forms a part of the frame, and on this is mounted a sleeve 16, having a flange 62. Bolted to this flange is the insulating-support 17, carrying eight double switch-arms 18, each opposite pair of arms being secured together and to the insulating-support by rivets. These arms are made of resilient metal, and as the insulating-support is turned each pair embraces its appropriate terminal, thus insuring a good electrical connection.

The insulating-support 17 is turned by the following means: The stud 29 carries a roller 28, which works in a forked extension of the sleeve 16, as shown in dotted lines in Fig. 3. These parts are so related that when the handle and segment-gear are turned the fork will be engaged and turned sufficiently by the roller, which then drops or passes beyond the fork in the remainder of its path of travel. When it returns, it will reëngage with the fork and will move it to the opposite extreme after passing the center, where it will again disengage itself, as on the opposite side. By this means the switch is set in either of its two positions according to the direction in which the handle is turned from its central position. The curved ends or stops of the segment-gear 25 limit the movement of rotation of the shaft 14 and the handle or lever 27 by striking against the pinion 15.

On the plate 24 are eight terminal blocks 19 19, 20 20, 21, 22, and 23 23, each block having a projecting lip 60, Fig. 11, which makes contact with the switch-arms 18 when the latter are turned. The said blocks 19 20, &c., are all counterparts and are secured at equidistant points, so that when the support 17 is turned to its extreme position in either direction the switch-arms 18 will be connected together in four sets.

Describing now the details of the resistance, this is divided into two separate parts, (see Fig. 8,) which lie on opposite sides of a vertical line through the center of the axis 14. The resisting material is in the form of a metallic ribbon 38, folded back and forth upon itself, adjacent laps or folds being separated by insulating-strips 52. This ribbon is divided into a number of sections, as shown in Fig. 8, which number is arbitrary, and between these sections are placed metallic dividing or spacing blocks 53, tapered or wedge shape in form, as shown. The sections of folded ribbon are placed so that the ribbons rest on their edges, that is to say, with the convolution in vertical planes. A resistance built up into circular form by two nearly semicircular series of ribbon-sections and spacing-blocks is secured in position by means of proper skeleton frames. The resistance is here shown as arranged radially, but any other form giving a curved outline may be used. Where large carrying capacity is required, two or more of these circular structures or resistances are clamped together, as shown in Fig. 7, and resistances of this form are diagrammatically illustrated in Figs. 9 and 10.

The frames that clamp or bind the resistances together consist of outer rings 30 31 32, connected by arms or spokes to central hubs and provided with laterally-extending lugs or teeth 54. By the use of these skeleton frames with teeth spaces for the circulation of air are provided, thus greatly improving the heat-radiating capacity of the instrument, and therefore increasing the current-carrying capacity of the resistance. The paths for the circulation of the air are indicated by the arrows in Fig. 7.

In order to prevent the metallic skeleton frames from coming in contact with the resistance-ribbon, strips 41 of insulation are employed both between the resistance-strips and the hubs of the rings and extending radially at the ends of the resistance, as shown in Fig. 8. Curved strips of insulation 40 are also interposed between the resistance and the inner rows of teeth of the skeleton frames and similar strips 39 between the resistance and the outer rows of teeth. Thus while the resistance coils or ribbon are firmly secured by the frames they are perfectly insulated therefrom and passages provided for the free circulation of air.

In order to still further bind the parts of the resistance securely, especially radially, we use the binding-bands 35, one for each circular series of resistances. These bands are of metal and are insulated from the resistances by strips 34 of insulation lying under the metal bands. These latter are tightened by turnbuckles 36 37, as shown in Fig. 8. Any suitable material may be employed for the insulation of the resistance, as above described.

The skeleton frames and resistances are securely bound together by bolts 55, passing through the former and provided with nuts. The resistance-ribbons with these connections may thus be handled as one unit.

The circuit connections of the resistance-sections are secured by the following devices: The spacing-blocks 53 have attached to them or cast integral with them bolts 33, which extend rearwardly through the base or plate 3 and through terminal or contact plates 4, arranged in a circular series on said plate and secured thereto by nuts. The plates 4 may also be secured to the plate 3 by bolts or otherwise. The bars or bolts 33 connect each spacing-block with its correspondingly-located contact-plate 4, and by thus locating the contact-plates directly in front of the points in the resistance to which it is desired to electrically connect said terminals and employing the means described for securing such connections all objectionable and uncertain wiring, with its attendant liability of short-circuiting, fusing of connections, and derangement, is entirely avoided.

The end spacing-blocks of each half of the resistance have bolts 43 56, extending both to the front and to the rear, as shown in Fig. 7, and to the ends 56 are connected the wires 42 for maintaining the necessary circuit connections.

The circular series of contact-plates 4 include a certain number of "dead-plates" 5, opposite the space or part of the resistance-frame containing no ribbon-sections or resistance. These dead-plates are put in simply to provide a bearing for the contact-brush as it passes over the "dead-space" of the switch and are not electrically connected with any part of the circuit.

The contact-arm 7 for the resistance contact-plates is mounted on the shaft 14, being insulated therefrom by a bushing 12. In order to impart the motion of the shaft to the arm, a hub 13 is keyed to shaft 14 and connected with arm 7 by insulating-pins 9. The contact-arm carries a brush or shoe at each end, which sweep over the series of contact-plates 4. The brush or shoe which we employ is of special construction and designed to obviate the objections to which ordinary spring-brushes are subject, the chief of which are due to wear and to the annealing of the tension-springs.

The shoe which we have devised is composed of two or more levers or toes 10, pivoted in two opposite sets to the arm 7 and overlapping or interlocking, the pivotal supports of the two sets being 57 and 58. Each toe is substantially L-shaped, with the pivot as the junction of the two limbs, the short limb extending upward, as shown in Fig. 5. Spiral springs 11 connect the upper ends of the short arms 59 of each two interlocking or overlapping toes, thus forcing the free ends against the contact-plates. We prefer to use two sets of toes for each shoe or contact-brush.

It is customary in arranging contact-springs to have them connect the movable toe with the frame of the shoe, but in such cases there are two paths formed for the passage of the current from the toe to the frame, one through the pivotal support for the toe, the other through the spring. Thus when the pivot becomes worn or becomes fouled and so makes poor contact a large portion of the current passes by way of the spring, thereby annealing it, so as to render it ineffectual in maintaining a good contact between the toe and the terminal plates. In our device, however, each spring is located between two toes, and there is therefore no tendency for current to pass through said spring.

The casing of the instrument is provided with openings covered by wire screens, as shown in Fig. 1, which permits the escape of heated air.

The resistance, as above explained, may be single, or two or more sets of resistances may be combined together in the same instrument when greater carrying capacity is required. In this case the arrangement of the resistances will be as shown in Fig. 7, one directly behind the other, and the contact-bolts 33 will connect with the corresponding wedges of each set, as shown diagrammatically in Figs. 9 and 10.

The connections and mode of operation of the instrument will be explained by reference to Figs. 9 and 10, which show the electrical connections of the controller to the source of current-supply, to the translating device, which is shown as a motor, and to a solenoid for operating a brake on said motor. $L+$ and $L-$ represent the two line-wires. The motor-armature is designated by 50, the series-wound field-coil of the motor by 47, the coils of the solenoid-brake by 45, the armature of the same by 44, the brake-band by 46, and the anchor for the band by 51. This band passes around a brake-wheel or disk keyed to the shaft of the motor.

In Fig. 9 the reversing-switch has been turned from right to left or anticlockwise, and the resistance-switch arm has been rotated in a like direction from its central position, (indicated in dotted lines and marked $h\, i$.) As this arm is thus rotated it first makes contact with the resistance when it has reached the position indicated by $j\, k$. In this position the current passes as follows: $L+$ to 22, to $23^b$, to $43^a$, through all the upper resistance 63 to $43^b$, thence by two paths (one by arm $j\, k$ and the other $19^a$ to $18^a$, to $23^a$, to $43^d$) to $43^d$, thence through all the lower resistance 64 to $43^c$, thence to $19^b$, to $18^b$, to $20^b$, through the armature 50 to $20^a$, to 21, to 47, to $L-$. This we will assume produces a rotation of the motor armature anticlockwise, such rotation being very slow, as all of the resistance is inserted. As the switch-arm is turned farther, it connects across from the upper contacts to the lower, thereby short-circuiting more or less resistance until it reaches the position indicated by $f\, g$, where all the resistance is short-circuited and the motor therefore running at full speed. It will thus be seen that the function of the contact-arm is simply to short-circuit more or less of the resistance in circuit, and to thereby regulate the speed of the motor.

Considering now the solenoid-circuit, it will be seen that the full difference of the potential of the line is at this time supplied to it, thus: $L+$ to 22, to $23^b$, to 45, to 49, to $L-$. The solenoid is therefore energized to its fullest extent and entirely releases the brake and allows the motor to revolve freely. When this apparatus is used for hoisting purposes, connections to the load are so made that when the solenoid is thus fully energized and the motor free to revolve unobstructed the load is being lifted, under which conditions no brake is desired. When it is desired to stop the motor, the lever 27 is turned to its central position, in which case the switch-arm resumes its central position $h\, i$ and the reversing-switch its central position, as shown by the dotted line. The latter in reaching this position, it will be noted, breaks the circuit at eight points, that is to say, at the blocks $19^a$, $19^b$, $20^a$, $20^b$, 21, 22, $23^a$, and $23^b$. These breaks taking place simultaneously as the arms 18 leave their respective blocks, the voltage is thereby divided at eight points and the arc in consequence prevented from destructive burning of the blocks.

When it is desired to reverse the motor and regulate its speed in the opposite direction, the switches are turned to the right or clockwise and their positions are indicated in Fig. 10. Here it will be noted that the current flows through the armature of the motor in a direction opposite to that which it followed in Fig. 9 and that the connections of the resistance have been changed. Thus L+ is connected to $43^a$ in Fig. 9 and to $43^d$ in Fig. 10. This is made necessary by reason of the fact that the direction of rotation of the contact-arm is reversed and that it is necessary in each case that the terminal of the line L+ shall always be connected to that resistance contact-plate which is reached last by the contact-arm in its travel over the series of resistance contact-plates, so that the resistance at first is all included in circuit and gradually cut out as the contact-arm approaches the last resistance contact-plate. It will be noticed that while the contact $43^a$ is first reached by the shoe when the arm is rotated clockwise, as in Fig. 10, it is reached last by the shoe under the conditions illustrated in Fig. 9. From this the necessity of reversing or changing the connection 43 will be understood.

It will now be seen from the above description and by reference to Figs. 9 and 10 that the whole series of contact-plates and resistance-coils are utilized in whatever direction the contact-arm is turned, and that the two portions of the series of resistances are connected in series and are bridged by the contact-arm. By this arrangement the duplicate sets of contacts usually employed in devices of this kind, but of which only one set is utilized for a given movement of the contact-arm, are obviated. This is a valuable feature, as the use of duplicate sets of contacts involves many disadvantages, among others additional cost, extra space, and extra wiring, or else a reduced number of contacts, which is in itself objectionable, since the greater the number of contacts the less the tendency to spark and burn.

Referring to the brake connections in Fig. 10, it will be understood that in this case it may be desired to have the brake more or less in action in lowering the load, depending upon the desired rapidity of lowering, the amount of load, and other conditions. When it is desired to lower slowly, the contact-arm is turned into the position $n\ p$ in Fig. 10, in which all the resistance is in circuit with the motor and only a portion of the full potential is applied to the solenoid, thereby causing the brake to be lifted only partially. This will be seen by tracing out the solenoid-circuit as follows: L+ to $23^a$, to $43^d$, thence through the lower resistance 64 to $43^c$. In passing through this resistance approximately one-half of the potential has been used up, and as the solenoid-current then flows from $43^c$ to $19^b$, to $18^b$, to $23^b$, to 45, to 49, to L— it will be seen that only half of the full potential is brought to bear on the solenoid, thus only partially releasing the brake.

If it be desired to operate at a higher speed, the arm is turned still further, clockwise, thereby cutting out some of the resistance and so increasing the motor speed, and since less of the potential is now used up in the lower resistance more potential is left for the solenoid, thus energizing it to a greater degree and easing the work correspondingly. This effect may be increased until the arm reaches the position $l\ m$, in which all resistance is cut out of the armature-circuit and nearly full potential is on the solenoid. As to the latter, it is to be noted that while the lower resistance is still in series with the solenoid the current passing through said resistance is so small (being now only the shunt-wound-solenoid current) that the fall of potential over said resistance is very slight, or, considering the matter in another way, the resistance of the solenoid is so high in comparison with that of the resistance-coil that the latter is practically negligible.

What we claim as our invention is—

1. In a rheostat or resistance, the combination with sections composed of a conductor of high resistance with interposed wedge-shaped spacing-blocks electrically connected to the resistance, all being associated and secured in circular form, of a plate or base secured over the resistance, a series of contact-plates thereon in positions corresponding to the spacing-blocks and bolts electrically connecting the spacing-blocks with their respective contact-plates, as set forth.

2. In a rheostat or resistance, the combination with sections composed of a metallic ribbon folded upon itself with insulating material interposed between the folds, of wedge-shaped spacing-blocks interposed between the sections of ribbon and in electrical connection therewith, the whole being arranged and secured in circular form, a plate secured to the circular resistance, a series of contact-plates thereon in positions corresponding to the spacing-blocks and bolts passing through the plates and electrically connecting the said contact-plates with the spacing-blocks respectively, as set forth.

3. In a rheostat or resistance, the combination with one or more circularly-arranged series of resistances, of skeleton frames having laterally-projecting lugs or teeth and insulated from the resistances and bolts for binding together the skeleton frames and clamping the interposed resistances, as set forth.

4. The combination with a variable resistance or rheostat, of a reversing-switch consisting of an insulated support having contact-arms, a sleeve upon which the support is mounted, a forked extension from said sleeve, a pivoted lever having a projection for engaging with the forked extension, and stationary terminals engaged by the contact-arms when the disk is moved by the engagement therewith of the projection when the lever is turned, as set forth.

5. The combination with the casing composed of two substantially similar halves or sections and provided with openings for the escape of heated air, of a resistance contained within the casing, a reversing-switch secured to the face of one half or section of the casing and a resistance-switch secured to the face of the other, as set forth.

6. The combination with the series of resistance-coils and contact-plates divided into two parts, a centrally-pivoted contact-lever, the ends of which travel over the plates of the two parts respectively, a reversing-switch and electrical connections whereby the operation of the reversing-switch connects the terminals of the line and translating devices respectively with the contact-plates of the two parts of the series of resistance-coils that are the last to be encountered by the contact-arm in its movement over said plates, as set forth.

7. The combination with the reversing-switch and lever for operating or throwing the same, of a segment-gear with curved ends or stops, moved by the lever and a rheostat or variable resistance in gear therewith, as set forth.

8. The combination with the pivoted lever, the shaft and pinion, a reversing-switch mounted loosely in respect to said shaft, a segment-gear carried by the lever and engaging with the pinion, and a projection on the lever in position to engage with a part moving with the reversing-switch whereby a movement of the said lever turns the shaft and throws the reversing-switch, as set forth.

JONATHAN P. B. FISKE.
CHARLES P. SMITH.

Witnesses:
H. W. HARRIS,
ALICE FORDING.